(12) United States Patent
Desberg et al.

(10) Patent No.: US 10,843,760 B2
(45) Date of Patent: Nov. 24, 2020

(54) SCOOTER WITH ROTATIONAL CONNECTION

(71) Applicant: RAZOR USA LLC, Cerritos, CA (US)

(72) Inventors: Ian Desberg, Cerritos, CA (US); William Griggs, Cerritos, CA (US)

(73) Assignee: RAZOR USA LLC, Cerritos, CA (US)

( * ) Notice: Subject to any disclaimer, the term of this patent is extended or adjusted under 35 U.S.C. 154(b) by 0 days.

(21) Appl. No.: 16/202,461

(22) Filed: Nov. 28, 2018

(65) Prior Publication Data

US 2019/0291805 A1    Sep. 26, 2019

Related U.S. Application Data

(63) Continuation of application No. 15/586,648, filed on May 4, 2017, now Pat. No. 10,144,476, which is a
(Continued)

(51) Int. Cl.
*B62K 5/10* (2013.01)
*B62K 5/06* (2006.01)
(Continued)

(52) U.S. Cl.
CPC ............... *B62K 5/10* (2013.01); *B62K 3/002* (2013.01); *B62K 5/027* (2013.01); *B62K 5/06* (2013.01);
(Continued)

(58) Field of Classification Search
CPC . B62K 5/10; B62K 5/027; B62K 5/06; B62K 3/002; B62K 6/60; B62K 23/06;
(Continued)

(56) References Cited

U.S. PATENT DOCUMENTS

| 4,071,261 A | 1/1978 | Winchell |
| 4,087,106 A | 5/1978 | Winchell |

(Continued)

FOREIGN PATENT DOCUMENTS

| FR | 2 689 082 A1 | 10/1993 |
| JP | 2003-532571 | 11/2003 |

(Continued)

OTHER PUBLICATIONS

International Search Report and Written Opinion in corresponding International Patent Application No. PCT/US2016/017205, dated Apr. 21, 2016.
(Continued)

*Primary Examiner* — Drew J Brown
(74) *Attorney, Agent, or Firm* — Knobbe, Martens, Olson & Bear, LLP

(57) ABSTRACT

A scooter device that can be propelled by side to side movement of a user is disclosed. The scooter device includes at least a first front wheel, at least a second and a third rearward located wheel, a frame structure through which the first wheel is coupled to the second and third wheels, wherein the second and third rearward located wheels are mounted in a biased direction arrangement and a steering mechanism that has a vertically ascending control member and is coupled to the first wheel such that turning of the steering mechanism achieves a turning of the first wheel, the steering mechanism further coupled to the frame structure such that the steering mechanism may be tilted relative to the frame structure. The frame structure can includes a first foot placement platform extending above the second wheel and a second foot placement platform extending above the third wheel.

20 Claims, 4 Drawing Sheets

Related U.S. Application Data continuation of application No. 15/019,680, filed on Feb. 9, 2016, now Pat. No. 9,643,679.

(60) Provisional application No. 62/114,766, filed on Feb. 11, 2015.

(51) Int. Cl.
  *B62M 6/60* (2010.01)
  *B62K 3/00* (2006.01)
  *B62K 5/027* (2013.01)
  *B62J 43/00* (2020.01)
  *B62K 23/06* (2006.01)

(52) U.S. Cl.
  CPC ............... *B62M 6/60* (2013.01); *B62J 43/00* (2020.02); *B62K 23/06* (2013.01); *B62K 2202/00* (2013.01); *B62K 2204/00* (2013.01)

(58) Field of Classification Search
  CPC ............ B62K 2202/00; B62K 2204/00; B62K 2208/00
  See application file for complete search history.

(56) References Cited

U.S. PATENT DOCUMENTS

| | | | |
|---|---|---|---|
| 4,123,079 | A | 10/1978 | Biskup |
| 4,165,093 | A | 8/1979 | Biskup |
| 4,540,192 | A | 9/1985 | Shelton |
| 5,039,121 | A | 8/1991 | Holter |
| D338,433 | S | 8/1993 | Crooks, Sr. |
| 5,551,717 | A | 9/1996 | De Courcey Milne |
| D449,017 | S | 10/2001 | Tsai |
| D450,631 | S | 11/2001 | Ridley et al. |
| 6,531,838 | B2 | 3/2003 | Parks |
| D483,821 | S | 12/2003 | Yang |
| 6,976,687 | B2 | 12/2005 | Beleski, Jr. |
| D524,193 | S | 7/2006 | Hong |
| D540,400 | S | 4/2007 | Starr |
| D553,198 | S | 10/2007 | Atri |
| 7,549,655 | B2 | 6/2009 | Fan |
| 7,681,895 | B2 | 3/2010 | Chen |
| D622,639 | S | 8/2010 | Brockmeyer |
| D626,038 | S | 10/2010 | Li |
| D630,158 | S | 1/2011 | Jessie, Jr. |
| 7,926,825 | B2 | 4/2011 | Chen |
| D654,542 | S | 2/2012 | Chiu |
| 8,128,109 | B2 | 3/2012 | Chen |
| D668,186 | S | 10/2012 | Tremblay |
| D680,175 | S | 4/2013 | Nielsen |
| D710,950 | S | 8/2014 | Grout |
| 8,807,581 | B2 | 8/2014 | Liao |
| D735,812 | S | 8/2015 | Delgatty |
| D739,310 | S | 9/2015 | Barnaby Latham |
| D745,608 | S | 12/2015 | Xu |
| D746,924 | S | 1/2016 | Delgatty |
| D774,969 | S | 12/2016 | Angelov et al. |
| D774,979 | S | 12/2016 | Delgatty et al. |
| D782,942 | S | 4/2017 | Trifaro et al. |
| D787,378 | S | 5/2017 | Ostergaard |
| 9,643,679 | B2 | 5/2017 | Desberg et al. |
| 9,873,476 | B2 | 1/2018 | Etzelsberger et al. |
| D824,291 | S | 7/2018 | Hsieh |
| D828,233 | S | 9/2018 | Fitzwater |
| 10,144,476 | B2 | 12/2018 | Desberg et al. |
| D845,837 | S | 4/2019 | Jin |
| D855,116 | S | 7/2019 | Desberg et al. |
| D885,987 | S | 6/2020 | Desberg et al. |
| 2002/0063406 | A1 | 5/2002 | Feng |
| 2002/0063411 | A1 | 5/2002 | Feng |
| 2003/0188906 | A1 | 10/2003 | Bank |
| 2004/0094925 | A1 | 5/2004 | Chuang |
| 2005/0035570 | A1 | 2/2005 | Chu |
| 2010/0234186 | A1 | 9/2010 | Fan |
| 2011/0031709 | A1 | 2/2011 | Kim et al. |
| 2011/0089656 | A1 | 4/2011 | Chiu et al. |
| 2011/0298193 | A1 | 12/2011 | Fan |
| 2012/0043733 | A1 | 2/2012 | Tsai |
| 2014/0070508 | A1 | 3/2014 | Yamabe |
| 2015/0068828 | A1 | 3/2015 | Delgatty et al. |
| 2015/0266530 | A1 | 9/2015 | O'Connell |
| 2017/0029060 | A1 | 2/2017 | Kim |
| 2017/0313375 | A1 | 11/2017 | Lee |
| 2017/0361892 | A1 | 12/2017 | O'Rourke |
| 2018/0072366 | A1 | 3/2018 | Kama et al. |

FOREIGN PATENT DOCUMENTS

| | | |
|---|---|---|
| JP | 3157958 | 3/2010 |
| JP | 2002-325878 | 11/2012 |
| KR | 200 438 635 | 2/2008 |
| KR | 2010 0007115 | 1/2010 |
| WO | WO 2009/041933 | 4/2009 |
| WO | WO 2016/130587 | 8/2016 |

OTHER PUBLICATIONS

Razor Drift Rider Electric Scooter with 3D Steering—First Look. YouTube., Mar. 28, 2018 [online], [retrieved on Jan. 21, 2020]. Retrieved from the Internet ,URL: https://www.youtube.com/watch?v=Yx-9eJ49Weo>.

"Razor PowerRider 360—Owner's Manual." Razor., Dec. 22, 2016 [online], [retrieved on Jan. 21, 2020]. Retrieved from the Internet <URL: https://www.razor.com/wp-content/uploads/2-18/02/PowerRider360_MAN_US_161222.pdf>.

SCOOTER WITH ROTATIONAL CONNECTION

INCORPORATION BY REFERENCE TO ANY PRIORITY APPLICATIONS

The present application is a continuation of U.S. patent application Ser. No. 15/586,648, filed May 4, 2017, which is a continuation of U.S. patent application Ser. No. 15/019,680, filed Feb. 9, 2016, which claims the benefit of U.S. Provisional Application No. 62/114,766, filed Feb. 11, 2015, the entirety of each of which is hereby incorporated by reference herein.

BACKGROUND

Field

The present disclosure relates generally to ridable vehicles and, more specifically, to a ridable scooter with a rotational connection.

Description of the Related Art

Riding on vehicles such as scooters or skateboards is a popular recreational activity. Scooters have become popular among many age groups and there are many different scooter variations and designs. Some scooters generally have at least two wheels and some type of steering mechanism. Some scooter designs include four or more wheels.

SUMMARY

Some scooters require a user to use his or her feet to push on the riding surface (e.g., the ground) to propel the scooter. It can be desirable that some scooters may be propelled without the use of a power unit (e.g., a motor). For example, it can be desirable for a scooter to be propelled through a twisting motion without requiring the user to use his or her feet to push on the riding surface and propel the scooter.

An aspect of one or more embodiments involves the realization that it is desirable to allow a user to ride on a scooter and move the scooter without the use of a motor or the user pushing off the riding surface. Therefore, the current arrangements in the prior art for ridable scooters are unsuitable and/or could be improved and/or made more desirable.

The systems, methods, and devices described herein have innovative aspects, no single one of which is indispensable or solely responsible for their desirable attributes. Without limiting the scope of the claims, some of the advantageous features of certain embodiments will now be summarized.

In one aspect, a scooter device includes a front wheel; a first rear wheel freely rotatable about a first rotation axis and pivotable about a first pivot axis; a second rear wheel freely rotatable about a second rotation axis and pivotable about a second pivot axis; a frame structure through which the front wheel is coupled to the first and second rear wheels, wherein the first and second rear wheels are mounted in a biased direction arrangement such that the first and second rear wheels are biased to return to a generally forward-facing direction; and a steering mechanism that has a steering shaft and is coupled to the front wheel such that turning the steering mechanism achieves a turning of the front wheel, the steering mechanism further coupled to the frame structure such that the steering mechanism may be tilted relative to the frame structure; wherein the frame structure includes a first foot placement platform extending above the first rear wheel and a second foot placement platform extending above the second rear wheel; and wherein, in use, the scooter is configured to be propelled by the user moving side to side, thereby shifting a portion of the weight of the user back and forth between the first and second placement platforms.

In some aspects, the scooter device further includes a power mechanism coupled to the frame structure, wherein the power mechanism drives the front wheel to propel the scooter device. In some aspects, the frame structure further includes a first rotation member and a second rotation member and the steering mechanism is connected to the second rotation member that is rotatable with respect to the first rotation member. In some aspects, an application of a lateral force on the steering mechanism results in tilting of the steering mechanism relative to the frame structure and the steering mechanism is biased to return to an initial position when the application of lateral force is removed. In some aspects, the pivot axis of each of the first and second rear wheels is inclined with respect to the first and second foot placement platforms. In some aspects, the scooter device further includes a brake assembly configured to selectively apply a braking force to the front wheel. In some aspects, the steering assembly further comprises a steering support member coupled between the steering shaft and the frame structure. In some aspects, the frame structure further includes a longitudinally-disposed support member, and the steering support member is connected to the longitudinally-disposed support member. In some aspects, the longitudinally-disposed support member comprises a first member and a second member and the first member is configured to rotate with respect to the second member. In some aspects, the second member slides within an end of the first member.

In another aspects, a personal mobility vehicle includes a front wheel; a pair of rear wheels; a frame structure having a first leg and a second leg, the first and second legs connected to a joint structure, a first platform connected to the first leg and a second platform connected to the second leg, the frame structure connecting the front wheel and the pair of rear wheels, the first platform having an upper surface configured to support a first foot of the user and the second platform having an upper surface configured to support a second foot of the user; and a steering mechanism having a steering shaft, the steering mechanism connected to the front wheel such that turning the steering mechanism turns the front wheel, the steering mechanism further connected to the joint structure such that the steering mechanism may be tilted relative to the frame structure.

In some aspects, the joint structure comprises a first member and a second member and the second member is configured to rotate with respect to the first member. In some aspects, the second member slides within an end of the first member. In some aspects, the steering mechanism further comprises a handlebar including two handgrip portions. In some aspects, the pair of rear wheels are caster wheels mounted in a forward tilted arrangement with respect to the first and second platforms. In some aspects, the personal mobility vehicle further includes a power mechanism configured to provide power to the front wheel. In some aspects, the power mechanism includes an electric motor that drives the front wheel.

In yet another aspect, a scooter includes a front wheel; a first rear wheel freely rotatable about a first rotation axis and pivotable about a first pivot axis; a second rear wheel freely rotatable about a second rotation axis and pivotable about a second pivot axis; a frame structure having a first leg and a second leg, the first and second legs connected to a joint structure, a first foot support platform connected to the first leg and a second foot support platform connected to the second leg, the frame structure connecting the front wheel and the first and second rear wheels; and a steering mechanism having a steering shaft connected to the joint structure such that the steering mechanism may be tilted relative to the frame structure, the steering mechanism connected to the front wheel; wherein, in use, the scooter is propelled by side to side movement of a user.

In some aspects, the scooter further includes a power mechanism configured to provide power to the front wheel. In some aspects, the power mechanism includes an electric motor that drives the front wheel.

BRIEF DESCRIPTION OF THE DRAWINGS

Throughout the drawings, reference numbers can be reused to indicate general correspondence between reference elements. The drawings are provided to illustrate example embodiments described herein and are not intended to limit the scope of the disclosure.

DETAILED DESCRIPTION OF CERTAIN EMBODIMENTS

Reference will now be made in detail to various embodiments of the present technology, which relates to various personal mobility devices, such as scooters. Although certain specific embodiments of the present technology are described, the present technology is not limited to these embodiments. On the contrary, these described embodiments are merely illustrative of the present technology, and the present technology is intended to also cover alternatives, modifications, and equivalents. Furthermore, in the following detailed description, numerous specific details are set forth in order to provide a thorough understanding of the present technology. However, it will be recognized by one of ordinary skill in the art that embodiments may be practiced without these specific details. In some instances, well known methods, procedures, compounds, compositions and mechanisms have not been described in detail as not to unnecessarily obscure aspects of embodiments of the present technology.

For the purposes of this disclosure, embodiments of personal mobility vehicles will be referred to as "scooters", but it will be understood by those with ordinary skill in the art that the present disclosure extends beyond the specifically disclosed embodiments and references to scooters to other alternative embodiments and/or uses of the invention and modifications and equivalents thereof. In particular, while the present vehicles and related methods have been described in the context of particularly preferred embodiments as it relates to scooters, the skilled artisan will appreciate, in view of the present disclosure, that certain advantages, features and aspects of the systems and methods may be realized in a variety of other applications, including personal mobility vehicles other than scooters and/or scooters with different arrangements of front and rear wheels.

Figure 1:
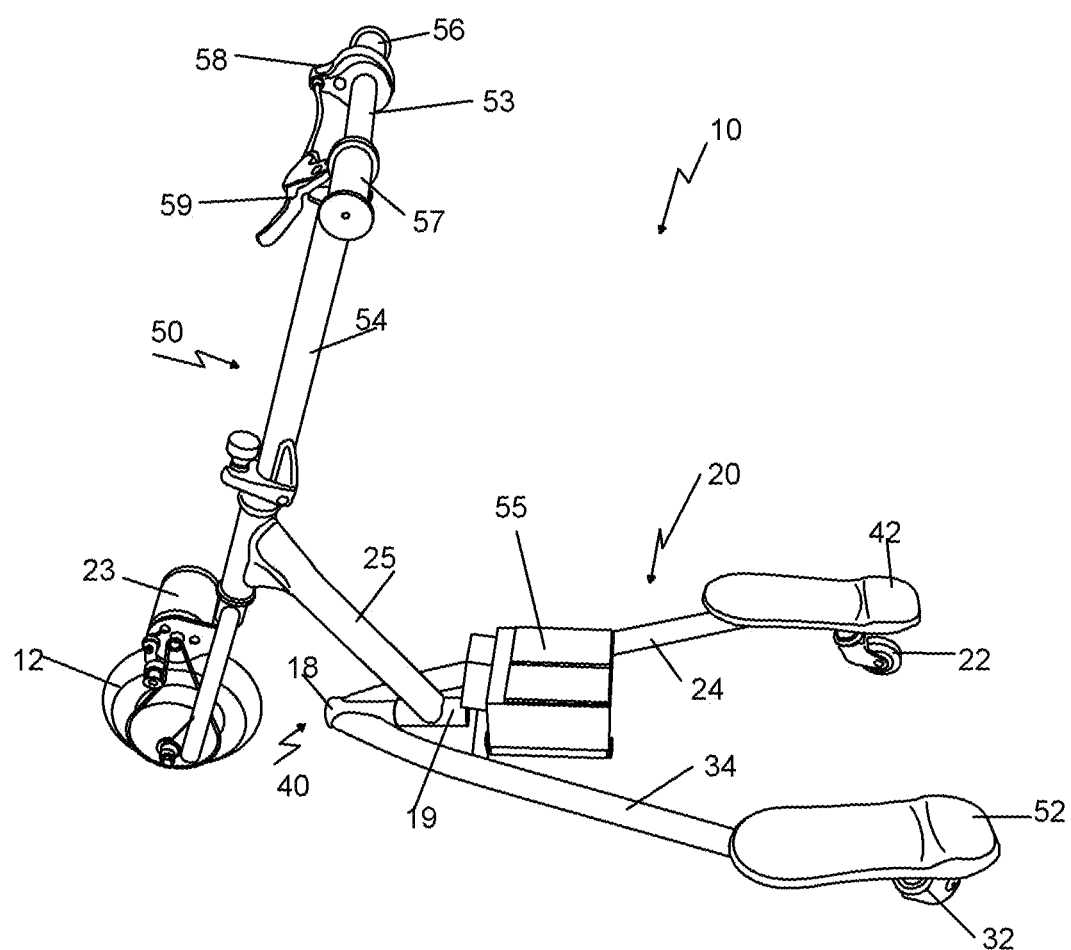
FIG. 1 illustrates a side perspective view of a scooter device in accordance with an embodiment.

In a preferred embodiment, a scooter device 10 may include a frame structure 20 that is coupled to a steering mechanism 50. In some embodiments, the frame structure 20 is connected with at least two rear wheels 22, 32. The frame structure 20 is connected to the steering mechanism 50 with a steering mechanism support member 25. The frame structure 20 may include a joint structure 40 from which legs 24 and 34 extend. In the embodiment of FIG. 1, a longitudinally disposed support is configured as multiple rotation members 18, 19 or other structure that connects the steering mechanism support member 25 and the legs 24, 34. The first and second rotation members 18, 19 are preferably configured such that the second rotation member 19 rotates with respect to the first rotation member 18, as will be discussed in greater detail below. In some embodiments, the second rotation member 19 may fit or slide within an end of the first rotation member 18. For example, as shown, the first and second rotation members 18, 19 can be generally coaxially aligned. Support member 25 may be non-movably coupled to steering mechanism 50 (shown in FIGS. 1-2) or movably coupled through a pivot or otherwise coupled.

The steering mechanism 50 includes a steering shaft 54 that is coupled to a front wheel 12 on one end and ascends to a handlebar 53 at its other end. In some embodiments, the steering shaft 54 is generally parallel to a vertical axis. The steering shaft may include multiple (telescoping or otherwise configured) sections and a height adjustment mechanism. The handlebar 53 may include two handgrip portions 56, 57 that the user may use to steer and control the scooter 10. As shown, the handlebar 53 may include one or more hand brakes 58, 59 that the user may actuate to brake the scooter. The hand brakes 58, 59 can be operably connected (e.g., via a cable) with a brake assembly (not shown) that is configured to engage to brake the scooter. For example, the brake assembly can be configured to engage with one of the wheels.

Figure 4:
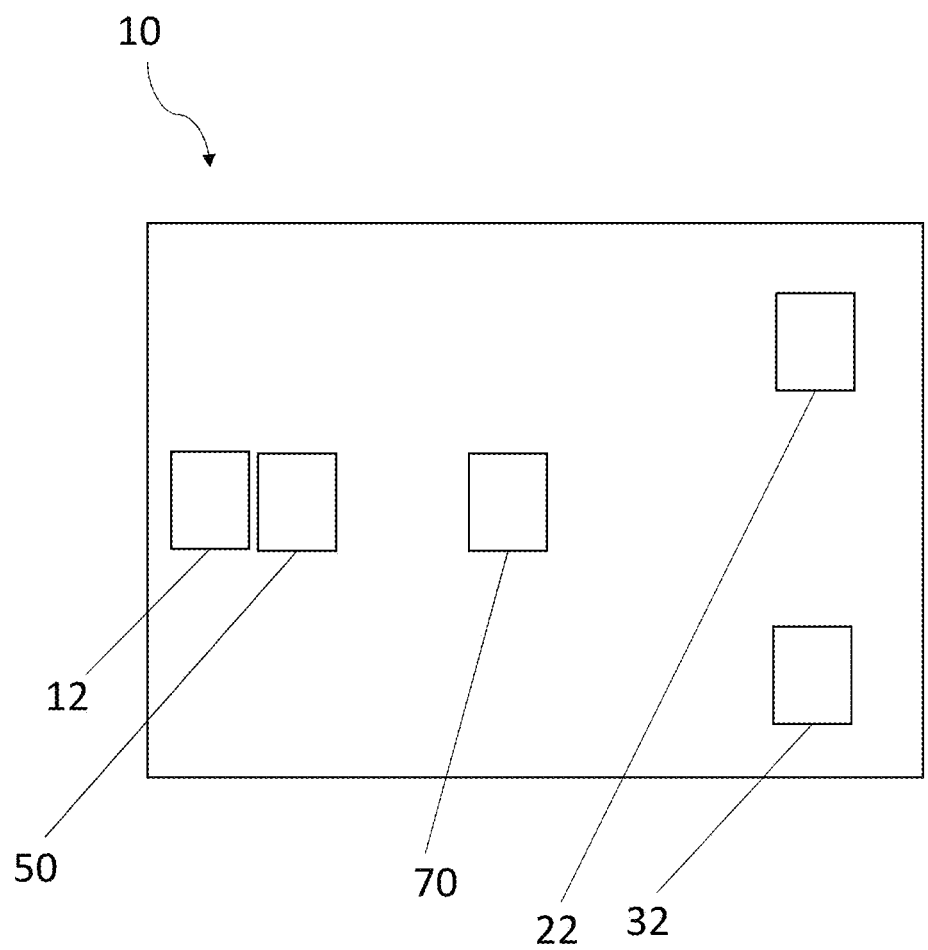
FIG. 4 illustrates a schematic view of a scooter device that includes a seat.

The scooter device 10 can include a location for the user to sit (such as a seat 70 as illustrated in FIG. 4) or stand. For example, the scooter device 10 may have a plurality of user platforms 42, 52 that are coupled to the legs 24, 34. As shown, in some embodiments, the platforms 42, 52 of FIGS. 1-2 extend substantially over the rear wheels 22, 32. The platforms 42, 52 provide surface areas on which a user can place their feet to ride on the scooter and/or perform stunts with the scooter.

In some embodiments, the rear wheels 22, 32 are caster wheels (and thus can also be called "rear swivel caster wheels"). In some embodiments, the rear wheels 22, 32 each comprise a wheel, fork, and shaft. The two rear wheels 22, 32 are preferably mounted in a forward tilted caster arrangement. This arrangement achieves a wheel that is capable of turning via rotation about its mounting shaft, yet which self-returns to the line of direction at which it is mounted. In some embodiments, the rear wheels 22, 32 are each tilted, relative to vertical, at least about: 5°, 10°, 15°, 20°, 25°, or otherwise.

The rear wheels 22, 32 may have a centering mechanism, which is configured to bias the rear wheels to a neutral (e.g., forward) steering position. For example, a spring action device may be mounted between the rear wheels 22, 32 and some portion of the user support platforms 42, 52 of the scooter. This can provide rotational resistance to the rear wheels 22, 32 relative to the platforms 42, 52. In certain embodiments, centering of the rear wheels 22, 32 may be provided by a biasing mechanism (e.g., torsion spring arrangement, such as a helical torsion spring). In these embodiments, the spring provides resistance to pivoting or turning of the fork about its turning axis. The biasing mechanism may also provide rotational resistance and a biasing force on the rear wheels to return the rear wheels to their neutral steering position when the scooter is being propelled by the user in a forward direction. Additional details regarding such centering wheels and/or biasing mechanisms can be found, for example, in U.S. Pat. No. 7,195,259, which is hereby incorporated by reference in its entirety.

As discussed above, the support member 25 connects the steering mechanism 50 to the frame structure 20. In some embodiments, the support member 25 may be fixedly coupled to the frame structure 20. For example the support member 25 may be welded or bolted to the frame structure 20.

In certain implementations, the support member 25 may be dynamically connected to the frame structure 20. For example, the support member 25 can connect with the second rotation member 19, which can be configured to move (e.g., rotate) relative to the first rotation member 18 of the frame structure 20. In some embodiments, the first and/or second rotation member 18, 19 includes a biased cam or the like that permits movement of the support member 25 with respect to the legs 24, 34 of the frame structure 20. In some variants, some or all of the support member 25 comprises a generally rigid, yet flexible, material with elastic properties, such as fiberglass, flexible metal, polyurethane or the like. The generally rigid, yet flexible, support member can permit the steering mechanism 25 to move relative to the legs 24, 34, which can permit a user to lean the steering mechanism 50 into a curve.

Figure 2:
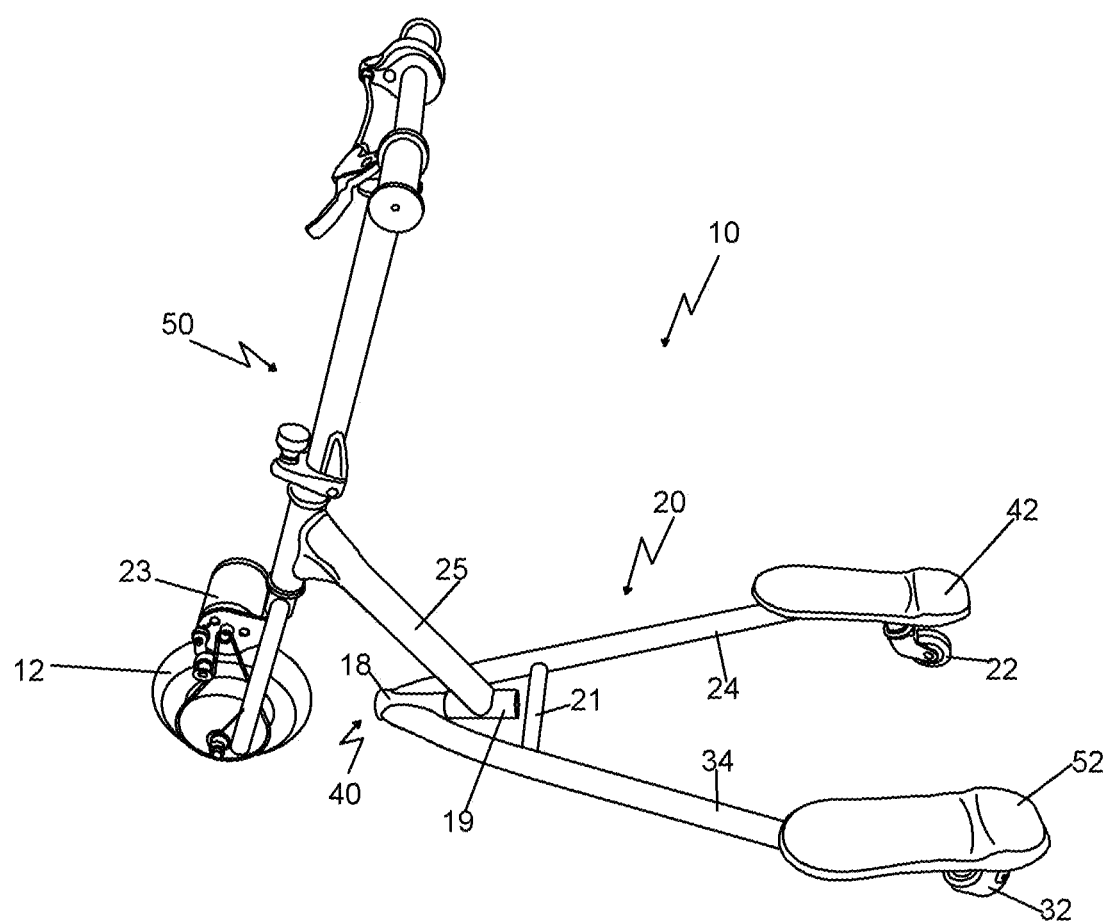
FIG. 2 illustrates a side perspective view of a scooter device in accordance with another embodiment.
Figure 3:
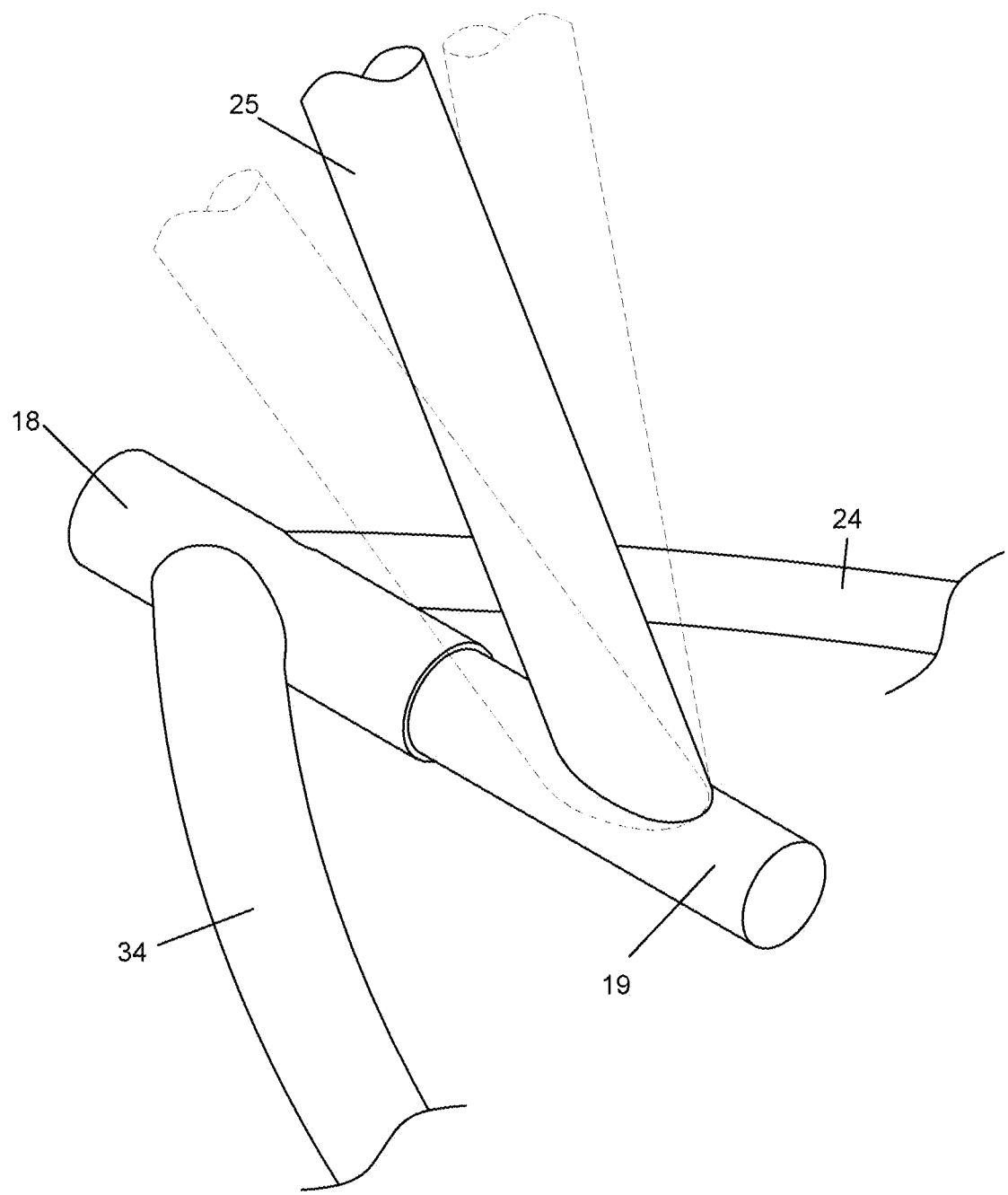
FIG. 3 illustrates a rotational connection of a handlebar member of the scooter device shown in FIG. 1 and FIG. 2.

As shown in FIG. 3, the second rotation member 19 preferably permits movement (e.g., side-to-side movement) of the support member 25 and the steering mechanism 50 in response to a displacement force applied by the user, such as a generally lateral force that the user applies via the handgrip portions 56, 57. In some embodiments, the second rotation member 19 is configured to return to a rest position (e.g., an initial position) in the absence of the displacement force. In some embodiments, in the rest position, the steering shaft 54 is generally parallel to a vertical axis, such as is shown in FIGS. 1 and 2.

In certain implementations, since the support member 25 is coupled to the steering mechanism 50 and to the second rotation member 19 (which is configured to move relative to the first rotation member 18 of the frame structure 20), the steering mechanism 50 can be moved (e.g., tilted) relative to the legs 24, 34 and the user platforms 42, 52. This can permit a user to adjust the steering mechanism 50, such as to lean the steering mechanism 50 into a turn, etc. In certain embodiments, the steering mechanism 50 is configured to tilt, from a vertical position and in a first direction (e.g., right), at least about: 30°, 40°, 50°, 60°, 75°, or otherwise. In various embodiments, the steering mechanism 50 is configured to tilt, from a vertical position and in a second direction (e.g., right), at least about: 30°, 40°, 50°, 60°, 75°, or otherwise. In some implementations, the steering mechanism 50 tilts independently of frame structure 20. For example, tilting of the steering mechanism 50 up to at least about 30° from vertical does not substantially move the frame structure 20. In some variants, tilting of the steering mechanism 50 up to at least about 40° from vertical does not result in either of rear wheels 22, 32 being raised off of the riding surface (e.g., ground).

As shown in FIGS. 1 and 2, rear wheels 22, 32 may be mounted below the foot or user platforms 42, 52. The rear wheels 22, 32 are preferably mounted to the platforms 42, 52 such that, in response to the user leaning the steering mechanism 50 to its right side (with respect to the advancing direction of the scooter), the rear wheels 22, 32 will roll to the right so that the user can turn the scooter device 10 to the right. Alternatively, in response to the user leaning the steering mechanism 50 to its left side (with respect to the advancing direction of the scooter), the rear wheels 22, 32 will roll to the left with respect to the advancing direction so that the user can turn to the left.

In some embodiments, to propel the scooter 10, a user shifts his or her weight from side to side on the platforms 42, 52 of the frame structure 20. This can apply a force to the frame structure 20 that results in the frame structure 20 moving relative to the steering mechanism 50. For example, such movement of the frame structure 20 can cause the steering mechanism 50 to rotate relative to the frame structure 20. As the user moves the frame structure 20 side to side due to the application of force on the platforms 42, 52, the rear wheels 22, 32 will make rolling angles with respect to the advancing direction or direction of travel. As a result, the user can propel the scooter 10 forward by twisting his or her body side to side without moving his feet from the platforms 42, 52. Alternatively, or in addition to the propulsion method discussed above, the user may use his feet to propel the scooter 10 by, for example, pushing against the ground.

In some embodiments, the scooter 10 may include a power mechanism 55, as shown in FIG. 1. The power mechanism 55 may be configured to provide power to front wheel 12 to propel the scooter without the user needing to push with his or her feet and/or without needing to move the frame structure side to side as described above. In some embodiments, the power mechanism 55 includes an electric motor 23 that drives the front wheel 12 using a belt. In many instances, the electric motor is a 250 W variable speed electric motor, though any of a variety of electric motors can be used. The power mechanism 55 preferably includes a battery that may be used to power the electric motor 23.

As shown, the legs 24, 34 can be connected by the first rotation portion 18. In some embodiments, the legs 24, 34 are connected by only the first rotation portion 18. In some embodiments, as shown in FIG. 2, additional support members, such as shaft 21 may run between the legs 24, 34 to provide additional stability to the scooter 10.

Terms of orientation used herein, such as "top", "bottom", "upward", "downward", "lower", "front", "frontward", "rear", "rearward", and "end" are used to simplify the description of the context of the illustrated embodiments. Likewise, terms of sequence, such as "first" and "second", are used to simplify the description of the illustrated embodiments. However, other orientation and sequences are possible, and the present disclosure should not be limited to the illustrated orientation(s). Those skilled in the art will appreciate that other orientations of the various components are possible.

Conditional language, such as "can," "could," "might," or "may," unless specifically stated otherwise, or otherwise understood within the context as used, is generally intended to convey that certain embodiments include or do not include certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although this invention has been disclosed in the context of certain preferred embodiments and examples, it will be understood by those skilled in the art that the present disclosure extends beyond the specifically disclosed embodiments to other alternative embodiments and/or uses of the invention and obvious modifications and equivalents thereof. In particular, while the present systems and methods have been described in the context of particularly preferred embodiments, the skilled artisan will appreciate, in view of the present disclosure, that certain advantages, features and aspects of the systems and methods may be realized in a variety of other applications, many of which have been noted above. Various features and aspects of the disclosed embodiments can be combined with or substituted for one another in order to form varying modes of the conveyor. The scope of this disclosure should not be limited by the particular disclosed embodiments described herein.

Additionally, it is contemplated that various aspects and features of the invention described can be practiced separately, combined together, or substituted for one another, and that a variety of combination and subcombinations of the features and aspects can be made and still fall within the scope of the invention. Certain features that are described in this disclosure in the context of separate implementations can also be implemented in combination in a single implementation. Conversely, various features that are described in the context of a single implementation can also be implemented in multiple implementations separately or in any suitable subcombination. Although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying drawings. The figures are drawn to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of personal mobility devices, such as scooters, have been disclosed. Although the devices have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular embodiments described above, but should be determined only by a fair reading of the claims that follow.

What is claimed is:

1. A personal mobility vehicle comprising:
   a front wheel;
   a plurality of rear wheels, each of the plurality of rear wheels being rotatable about a respective rotation axis and pivotable about a respective pivot axis;
   a frame structure comprising a longitudinally-disposed member, a first leg, a second leg, a first platform, and a second platform, each of the first and second platforms being configured to support a user's foot, wherein the longitudinally-disposed member comprises a first member and a second member, the second member being rotatable relative to the first member, and wherein the first and second legs are fixed relative to each other;
   a seat;

a steering mechanism comprising a steering support member, the steering support member being connected to the longitudinally-disposed member of the frame structure; and
a power mechanism comprising a motor configured to drive the front wheel.

2. The personal mobility vehicle of claim 1, wherein the first platform is connected to the first leg and the second platform is connected to the second leg.

3. The personal mobility vehicle of claim 1, wherein the first leg and the second leg are connected by only the first member.

4. The personal mobility vehicle of claim 1, further comprising a shaft extending between the first leg and the second leg.

5. The personal mobility vehicle of claim 1, wherein an application of a lateral force on the steering mechanism causes tilting of the steering mechanism relative to the frame structure.

6. The personal mobility vehicle of claim 5, wherein the steering mechanism is biased to return to an initial position when the application of the lateral force is removed.

7. The personal mobility vehicle of claim 1, wherein a portion of the second member slides within a portion of the first member.

8. A personal mobility vehicle comprising:
a front wheel;
a plurality of rear wheels, each of the plurality of rear wheels being rotatable about a respective rotation axis and pivotable about a respective pivot axis;
a frame structure comprising a longitudinally-disposed member, a first platform, and a second platform, each of the first and second platforms being configured to support a user's foot, wherein the longitudinally-disposed member comprises a first member and a second member, the second member being rotatable relative to the first member;
a laterally extending support connected to the frame structure, the support configured to inhibit relative movement of the first and second platforms;
a seat;
a steering mechanism comprising a steering support member, the steering support member being connected to the longitudinally-disposed member of the frame structure; and
a power mechanism comprising a motor configured to drive the front wheel.

9. The personal mobility vehicle of claim 8, wherein an application of a lateral force on the steering mechanism causes tilting of the steering mechanism relative to the frame structure.

10. The personal mobility vehicle of claim 9, wherein the steering mechanism is biased to return to an initial position when the application of the lateral force is removed.

11. The personal mobility vehicle of claim 8, wherein a portion of the second member slides within a portion of the first member.

12. The personal mobility vehicle of claim 8, wherein the first member and the second member are coaxially aligned.

13. The personal mobility vehicle of claim 8, wherein the steering mechanism further comprises a handlebar including a handgrip portion.

14. A personal mobility vehicle comprising:
a front wheel;
a plurality of rear wheels, each of the plurality of rear wheels being rotatable about a respective rotation axis and pivotable about a respective pivot axis;
a frame structure comprising a longitudinally-disposed member, a first platform, and a second platform, each of the platforms being configured to support a user's foot, wherein the longitudinally-disposed member comprises a first member and a second member, the second member being rotatable relative to the first member;
a seat;
a steering mechanism comprising a steering support member, wherein the steering support member couples the steering mechanism to the frame structure, the steering support member being connected to the longitudinally-disposed member, wherein the steering mechanism is configured to rotate and tilt relative to the frame structure; and
a power mechanism comprising a motor configured to drive the front wheel.

15. The personal mobility vehicle of claim 14, further comprising a first leg and a second leg.

16. The personal mobility vehicle of claim 15, wherein the first platform is connected to the first leg and the second platform is connected to the second leg.

17. The personal mobility vehicle of claim 15, wherein the first leg and the second leg are connected by only the first member.

18. The personal mobility vehicle of claim 15, wherein the first and second legs extend rearward at an angle.

19. The personal mobility vehicle of claim 14, wherein an application of a lateral force on the steering mechanism causes tilting of the steering mechanism relative to the frame structure.

20. The personal mobility vehicle of claim 19, wherein the steering mechanism is biased to return to an initial position when the application of the lateral force is removed.

* * * * *